United States Patent [19]
Reiker

[11] Patent Number: 5,854,443
[45] Date of Patent: Dec. 29, 1998

[54] LOAD SUPPORTING ELECTRICAL BOX SUITED FOR ATTACHING TO A JOIST

[76] Inventor: Kenneth H. Reiker, P.O. Box 4106, Shalimar, Fla. 32579

[21] Appl. No.: 371,695

[22] Filed: Jan. 12, 1995

[51] Int. Cl.[6] .................................................. H01R 13/46
[52] U.S. Cl. ............................................................ 174/58
[58] Field of Search ...................... 174/48, 58; 220/3.2, 220/3.3, 3.9; 248/906, 205.3

[56] References Cited

U.S. PATENT DOCUMENTS

| | | | |
|---|---|---|---|
| Re. 33,147 | 1/1990 | Reiker | 248/200.1 |
| D. 288,289 | 2/1987 | Reiker | D8/380 |
| 1,819,460 | 8/1931 | Frank | 248/216.4 |
| 2,264,666 | 12/1941 | Hexdall | 411/466 |
| 2,423,757 | 7/1947 | Dedge | 220/3.9 |
| 2,973,175 | 2/1961 | Appleton | 248/27.1 |
| 3,097,821 | 7/1963 | Richards | 248/217.3 |
| 3,616,096 | 10/1971 | Roeder | 248/205 A X |
| 4,140,293 | 2/1979 | Haasen | 248/217.2 |
| 4,275,862 | 6/1981 | Takagi et al. | 248/205 A |
| 4,463,923 | 8/1984 | Reiker | 248/546 |
| 4,684,092 | 8/1987 | Reiker | 248/200.1 |
| 4,747,506 | 5/1988 | Stuchlik, III | 220/3.9 |
| 4,787,587 | 11/1988 | Deming | 248/205.1 |
| 4,880,128 | 11/1989 | Jorgensen | 220/3.9 |
| 5,234,119 | 8/1993 | Jorgensen et al. | 220/3.9 |
| 5,407,088 | 4/1995 | Jorgensen et al. | 220/3.9 |
| 5,408,045 | 4/1995 | Jorgensen et al. | 174/58 |
| 5,484,076 | 1/1996 | Petrushka | 220/3.9 |
| 5,522,577 | 6/1996 | Roesch | 248/906 X |

FOREIGN PATENT DOCUMENTS

| | | |
|---|---|---|
| 2436518 | 4/1980 | France . |
| 1309950 | 3/1973 | United Kingdom . |

*Primary Examiner*—Dean A. Reichard
*Attorney, Agent, or Firm*—Shlesinger Arkwright & Garvey LLP

[57] ABSTRACT

An electrical fixture mounting assembly includes a junction box having a wall defining a junction box cavity therein. There are provided one or more members on the wall for attaching the junction box to a support. Such attachment members include spaced apart mounting brackets which are configured for engaging various sizes and shapes of supports. In addition, there are provided adhesive members for supplementing and/or replacing the attachment members so that the fixture mounting assembly can be readily attached to a variety of surfaces.

33 Claims, 4 Drawing Sheets

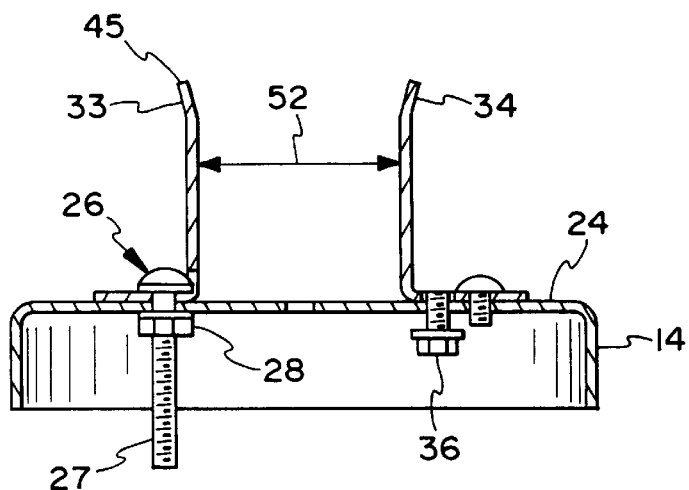
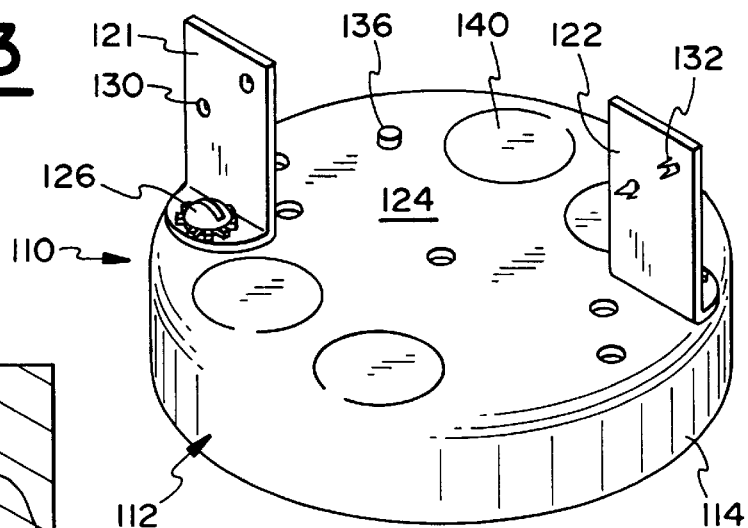
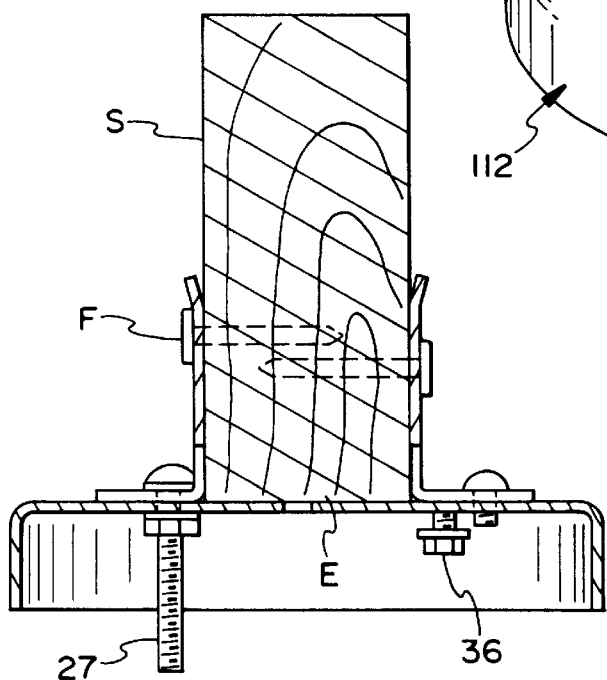

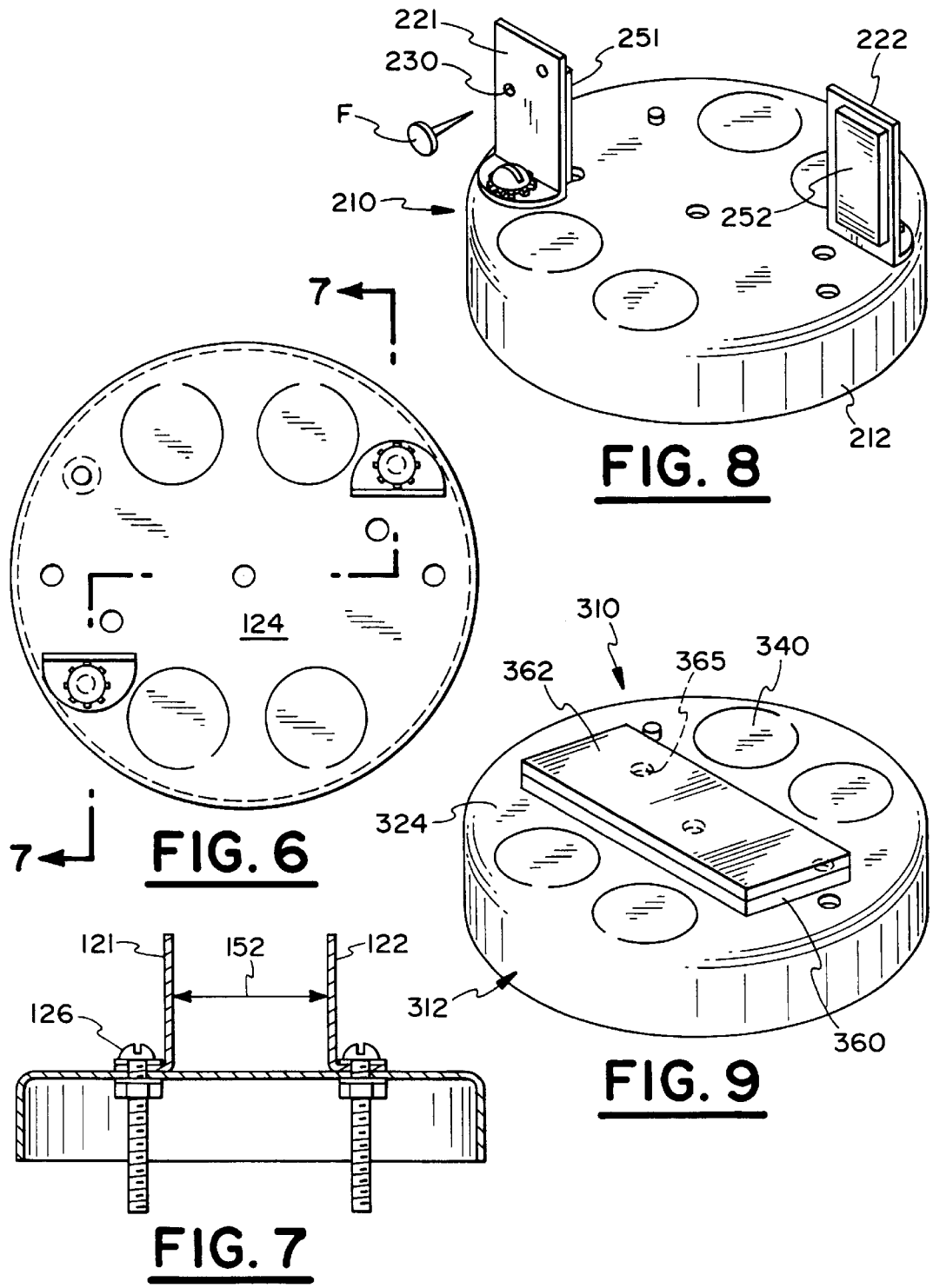

LOAD SUPPORTING ELECTRICAL BOX SUITED FOR ATTACHING TO A JOIST

FIELD OF THE INVENTION

This invention relates to a fixture mounting assembly and a junction box for installation on wall, floor, or ceiling joists.

BACKGROUND OF THE INVENTION

Conventional junction boxes are known for mounting to elongated supports, such as ceiling joists and studs in walls.

There have even been a few prior art designs for attaching junction boxes to ceiling joists that are intended to carry the weight of an electrical fixture, such as a chandelier or ceiling fan. Such fixtures are becoming heavier nowadays, and building codes are becoming more strict. In addition, the marketplace is becoming increasingly competitive. Furthermore, homeowners are doing more retrofit installations of such junction boxes and fixtures, and easily and accurately installed devices are especially appropriate for use by lay people. Thus, there is a need for a junction box which is suitable for carrying large static and dynamic loads, is easy to install, is inexpensive to manufacture, and can be installed regardless of the shape and profile of the horizontal joist or vertical stud.

U.S. Pat. No. 5,234,119 to Jorgensen et al. is an example of existing technology for a plastic junction box for ceiling fan support that is particularly suited for use with joists.

U.S. Pat. No. 4,140,293 to Hansen discloses a non-nail U-shaped clamp type barbed bracket for supporting electric outlet box, and which discloses a metal prong for preventing vertical movement along a stud, as well as two inwardly inclined barbs which will dig into the adjacent sides of the stud and prevent the removal of the clamp from the stud. Although the Hansen device likely works for its intended purpose of attaching an electrical box to a vertical stud, the Hansen device is unsuitable for heavy duty applications, such as chandeliers, and applications experiencing severe dynamic loads, such as vibrating ceiling fans.

Thus, it can be seen that there is a need for a electrical fixture mounting assembly which is engineered for use under high static and dynamic load conditions, yet which is easy to install, and simple and inexpensive to manufacture.

OBJECTS AND SUMMARY OF THE INVENTION

Accordingly, it is an object of the invention to provide an electrical fixture mounting assembly which overcomes the drawbacks and disadvantages of the prior art devices.

A further object of the invention is to provide an electrical fixture mounting assembly which is suited for use in walls, floors, and ceilings, regardless of the configuration of the stud or joist to which the electrical fixture mounting assembly is attached.

Another object of the invention is to provide an electrical fixture mounting assembly which can be inexpensively manufactured.

A still further object of the invention is to provide an electrical fixture mounting assembly box having a junction box that is engineered so that large static and dynamic loads are transferred directly to the joist or stud on which the junction box is installed, as opposed to transferring forces to the junction box itself.

A further object of the invention is to provide an electrical fixture mounting assembly suited for use in new construction as well as for retrofitting in existing walls and ceilings.

Another object of the invention is to provide an electrical fixture mounting assembly which is more resistant to oxidation and rusting then earlier devices.

Yet another object of the invention is to provide an electrical fixture mounting assembly which is easier and faster to install and to use than conventional devices.

Yet a further object of the invention is to provide an electrical fixture mounting assembly having an attachment site to which fixtures can be more readily attached than with conventional devices.

It is a still further object of the invention to provide an electrical fixture mounting assembly which can be temporarily attached, as well as permanently attached, to a variety of supports.

A still further object of the invention is to provide an electrical fixture mounting assembly which is suited for "single-handed" installation.

Another object of the invention is to provide an electrical fixture mounting assembly which can be readily installed by one person.

Another object of the invention is to provide an electrical fixture mounting assembly which is quicker to install than conventional electrical fixture mounting assemblies.

In summary, therefore, the invention is directed to an electrical fixture mounting assembly which is strong, easily and speedily used, and which overcomes the drawbacks of the prior art devices.

In one embodiment of the invention, there is provided an electrical fixture mounting assembly having a junction box, the junction box including a wall defining a junction box cavity therein. There is means disposed on the wall for engaging the junction box with opposite sides of an irregularly shaped joist.

In another embodiment of the invention, there is provided an electrical fixture mounting assembly including a junction box having a wall defining a junction box cavity therein. There is a first mounting bracket on the wall that is configured for attaching to a joist. A second mounting bracket is provided that is likewise configured for attaching to a joist. The first and second mounting brackets are spaced apart and configured and positioned relative to each other for engaging opposite sides of an irregularly shaped joist.

In yet another preferred embodiment of the invention, there is provided an electrical fixture mounting assembly including a junction box. The junction box has a wall defining a junction box cavity therein, and means is disposed on the wall for adhering the junction box to opposite sides of a joist.

In yet another preferred embodiment of the invention, there is provided an electrical fixture mounting assembly including a junction box. The junction box has a wall defining a junction box cavity therein, and means is disposed on the wall for adhering the junction box to the bottom of a joist.

The term "irregularly shaped joist" includes supports which are non-linear, are warped, have surface irregularities, and the like, for example.

The invention will be further described with reference to the following drawings.

BRIEF DESCRIPTION OF THE DRAWINGS

FIG. 3 is a sectional view of the electrical fixture mounting assembly of FIG. 2, taken along line 3—3 therein;

FIG. 4 is a side elevational view of the embodiment of the electrical fixture mounting assembly of FIG. 1, when installed;

FIG. 5 is a perspective view of an electrical fixture mounting assembly according to a further embodiment of the invention;

FIG. 6 is a top plan view of the embodiment of FIG. 5;

FIG. 7 is a sectional view of the embodiment of FIG. 6 taken along line 6—6 therein;

FIG. 8 is a perspective view of a still further embodiment of an electrical fixture mounting assembly according to the invention; and, FIG. 9 is a perspective view of a yet still further embodiment of the electrical fixture mounting assembly according to the invention.

DETAILED DESCRIPTION OF THE INVENTION

Figure 1:
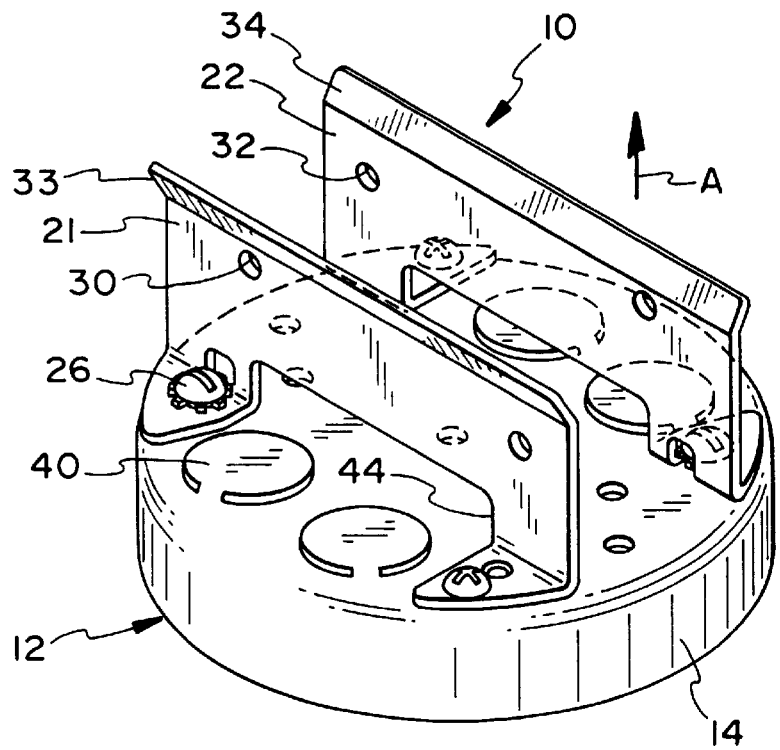
FIG. 1 a perspective view of a first preferred embodiment of an electrical fixture mounting assembly according to the invention.
Figure 2:
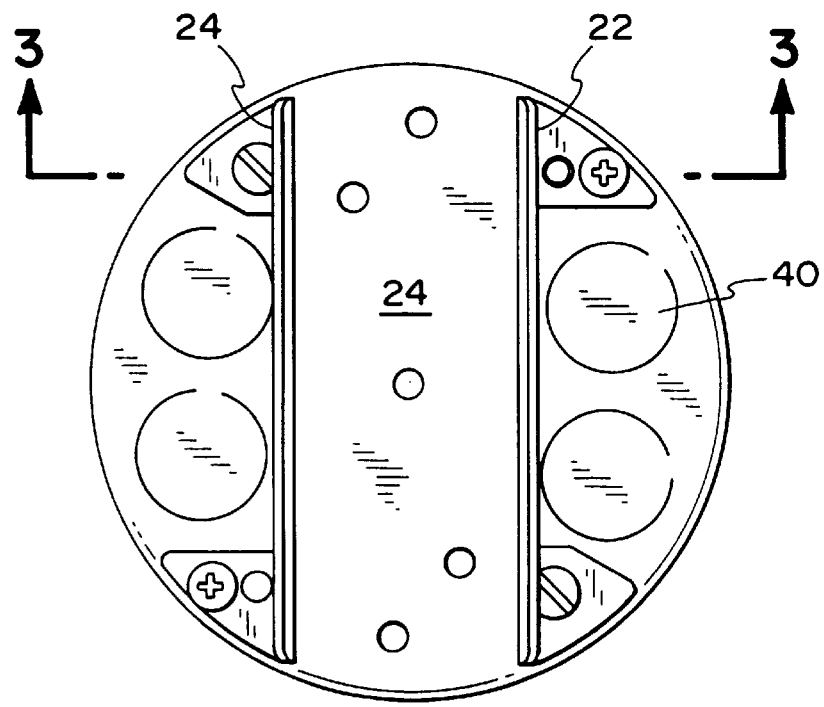
FIG. 2 is a top plan view of the preferred embodiment of the electrical fixture mounting assembly of FIG. 1.

Turning to FIGS. 1–4, a first embodiment of an electrical fixture mounting assembly 10 according to the invention will be described.

Electrical fixture mounting assembly 10 includes a junction box 12 having a wall 14 defining a junction box cavity therein. There is provided a means for engaging opposite sides of an irregularly shaped joist, for example. Such engaging means includes a first mounting bracket 21 and a second mounting bracket 22 extending outwardly from an upper wall 24 of junction box 12.

Good results have been achieved when first and second mounting brackets 21, 22 were variably fixedly attached to upper wall 24 by fasteners 26, such as screws 27 and locking washers 28. It is likewise contemplated that first and second mounting brackets 21, 22 will be more rigidly attached to junction box 12, such as by riveting, welding, and the like.

Fasteners 26 are preferably sufficiently strong so that a fixture such as a ceiling fan or chandelier can be supported thereby. For example, screw 27 will be configured for supporting a fixture, such as a ceiling fan or a chandelier. Screw 27 typically extends past box 12. It will be appreciated that screw 27 will transfer the weight of an attached fixture directly to first mounting bracket 21, without exerting any of such weight on junction box 12. Bracket 21, when installed, will thus directly transfer the weight of a fixture supported by screw 27 to a support S (i.e., by exerting substantially none of the weight of the fixture on junction box 12).

Each of first and second mounting brackets 21, 22 may include one or more holes 30 through which a fastener will be inserted for permanently mounting electrical fixture mounting assembly 10 to a support member, such as a stud. Optional sharp extensions of material or "blowouts" 32 can be provided on one or more of first and second mounting brackets 21, 22 for temporarily securing electrical fixture mounting assembly 10 to a support member.

Preferably, an outwardly extending flange 33 will be provided on the free end of first mounting bracket 21. Flange 33 will typically extend transversely relative to the remainder of first mounting bracket 21.

Furthermore, it is contemplated that a second flange 34 will be provided on the free end of second mounting bracket 22. Flange 34 extends transversely relative to the remainder of second mounting bracket 22. Good results have been achieved when first and second flanges 33, 34 extend outwardly away from the middle of electrical fixture mounting assembly 10. As can be appreciated from considering FIG. 4, in use, flanges 33 and 34 will extend outwardly away from a support S to which they are attached, for reasons which will be explained in detail under OPERATION below.

An electrical grounding connector 36 may be provided.

Likewise, one or more removable plates or "knockouts" 40 will typically be provided in wall 14 of junction box 12.

Conveniently, an opening 44 is defined in first and second mounting brackets 21, 22 to both accommodate the removal of knockouts 40 and to provide room for inserting electrical wires, cables, and ROMEX™ connectors in the openings left by the removal of knockouts 40.

As will be readily appreciated, first mounting bracket 21 is offset from second mounting bracket 22 by a distance 52 selected to accommodate the support member S to which electrical fixture mounting assembly 10 will be attached. Thus, in the case where electrical fixture mounting assembly 10 is to be attached to a conventional 2"×4" wooden stud having a nominal width nowadays of less than two inches, offset 52 will be less than about two inches more or less. Good results have been achieved when offset 52 is less than the width of the support with which first and second mounting brackets 21, 22 will engage. By making offset 52 less than the expected width of the support, the support S will positively engage first and second mounting brackets 21, 22 and force them apart so that first and second mounting brackets 21, 22 firmly engage support S.

In the example of my embodiment as shown in FIGS. 3 and 4, flanges 33, 34 extend outwardly away from the center of electrical fixture mounting assembly 10, as such orientation of flanges 33 and 34 has provided good results when electrical fixture mounting assembly 10 is used with wooden studs S. By providing the outwardly flared opening established by flanges 33, 34, stud S tends to be guided into engagement with wall 24. Thus, in use a first mounting bracket 21 which is "misaligned" with stud S is less likely to have an outermost end 45 engage with stud S (e.g. with a lower free end E) during insertion.

Turning now to FIGS. 5–7, a further embodiment of an electrical fixture mounting assembly 110 according to my invention is shown.

Electrical fixture mounting assembly 110 includes a junction box 112 having a wall 114 for defining a junction box cavity. There is provided a means for engaging opposite sides of a support member, such as an irregularly shaped joist. Such engaging means includes a first mounting bracket 121 and a second mounting bracket 122 extending outwardly from an upper wall 124 of junction box 112. Good results have been achieved when first and second mounting brackets 121, 122 were variably fixedly attached to upper wall 124 by fasteners 126, such as sheet metal screws and locking washers. It is likewise contemplated that first and second mounting brackets 121, 122 will be more rigidly attached to junction box 112, such as by riveting, welding, or the like.

Each of first and second mounting brackets 121, 122 includes one or more holes 130 through which a fastener will be inserted for permanently mounting electrical fixture mounting assembly 110 to a support member, such as a stud. Optional sharp extensions of material or "blowouts" 132 can be provided on one or more of first and second mounting brackets 121, 122 for temporarily securing electrical fixture mounting assembly 110 to a support member.

An electrical grounding connector 136, the free end of which is visible in FIG. 5, will typically be provided. Likewise, one or more removable plates or "knockouts" 140 will typically be provided in wall 124 of junction box 112.

Preferably, first and second mounting brackets 121, 122 are sufficiently small to both accommodate the removal of knockouts 140 and to provide room for inserting electrical wires, cables, and ROMEX™ connectors in the openings left by the removal of knockouts 140. In addition, the size of first and second mounting brackets 121, 122 will allow for assembly 110 to be attached to a wide variety of support members of varying width.

As will be readily appreciated, first mounting bracket 121 is offset from second mounting bracket 122 by a distance 152 selected to accommodate the support member to which electrical fixture mounting assembly 110 will be attached. Thus, where electrical fixture mounting assembly 110 is to be attached to a conventional wooden 2"×4" stud having a nominal width of two inches, offset 152 will be about that nominal width of two inches more or less.

The provision of detachable fasteners 126 allows for the orientation of first and second mounting brackets 121, 122 to be adjusted, and for brackets 121, 122 to be removed, as desired.

FIG. 8 illustrates a yet still further preferred embodiment of an electrical fixture mounting assembly 210 according to the invention.

Electrical fixture mounting assembly 210 includes a junction box 212 having a first mounting bracket 221 extending outwardly therefrom.

A second mounting bracket 222 may likewise be provided. Good results have been achieved when second mounting bracket 222 is spaced apart from first mounting bracket 221. By spacing apart first and second mounting brackets 221, 222, a large variety of widths of supports can be accommodated, as well as irregularly shaped supports.

Means is provided for adhering first mounting bracket 221 to a support. The adhering means can be provided in the form of a piece of tape 251, which tape has an adhesive thereon sufficiently strong to support the weight of electrical fixture mounting assembly 210.

It is contemplated that a second adhesive means be provided on second mounting bracket 222. Second adhesive means may likewise be a piece of tape 252.

Preferably, the adhesive provided on tape 251 is sufficiently strong to support electrical fixture mounting assembly 210 for a period of time long enough for a user to permanently attach electrical fixture mounting assembly 210 to a support by use of a fastener F inserted through a hole 230 provided in first mounting bracket 221. Likewise, when second adhesive means 252 is provided, the adhesive of at least first and second adhesive means collectively will be sufficiently strong to temporarily support electrical fixture mounting assembly 210 to a support while a user is permanently fastening assembly 210 to the support. Fastener F may likewise be inserted from below in all embodiments, such as through hole 365 in the embodiment of FIG. 9. Fasteners F are typically screws or nails.

A yet still further embodiment of an electrical fixture mounting assembly 310 according to my invention is shown in FIG. 9. Electrical fixture mounting assembly 310 includes a junction box 312 having an upper wall 324. Knockouts 340 will typically be provided in upper wall 324.

Means is provided for adhering electrical fixture mounting assembly 310 to a support surface; for example, such adhering means has been successfully provided by the use of a piece of tape 360. Good results have been achieved by the use of so-called double-sided tape which includes a piece of release paper 362 covering the adhesive on the outer face of tape 360, until such time as electrical fixture mounting assembly 310 is to be installed.

FIG. 9 shows electrical fixture mounting assembly 310 with a piece of double-sided tape 360 already mounted on upper wall 324 by the adhesive on the side of tape 360 opposite to the side on which illustrated release paper 362 remains.

Preferably, adhesive tape 360 will be disposed between knockouts 340 for avoiding interference therewith. The adhesive used on tape 360 is preferably sufficiently strong to support electrical fixture mounting assembly 310 during the time it takes a user to fixedly attach electrical fixture mounting assembly 310 to a support by inserting fasteners through mounting holes 365 after tape 360 has been adhered to the mounting surface. Expected mounting surfaces include the faces of wooden and steel wall studs and joists, for example. Thus, any patch of glue, putty, or adhesive, such as a spray-on adhesive, is expected to be used in addition to, or instead of, adhesive tape 360.

Figure 10:
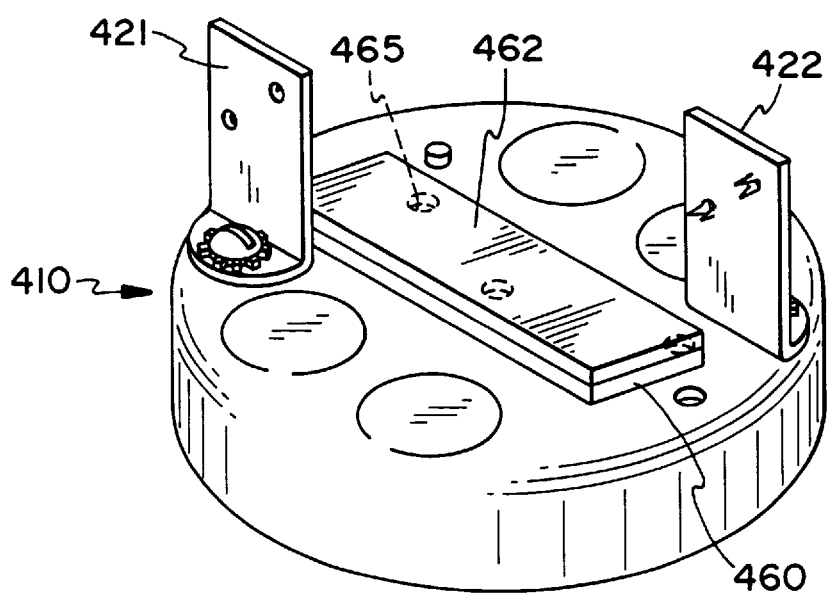
FIG. 10 is a perspective view of a yet still further embodiment of the electrical fixture mounting assembly according to the invention.

FIG. 10 shows an electrical fixture mounting assembly 410 with a piece of double-sided tape 460 mounted on the wall, as in the embodiment of FIG. 9. A release paper 462 is provided on tape 460. First and second mounting brackets 421, 422 are attached to mounting assembly 410, such as shown in the embodiment of FIG. 5. A fastener may be inserted through mounting hole 465, as discussed regarding earlier embodiments.

OPERATION

In use, the electrical fixture mounting assembly 10 according to the embodiment of FIGS. 1–4 will be mounted to stud S as shown in FIG. 4. The user will typically hold electrical fixture mounting assembly 10, such as by grasping junction box 12, and moving assembly 10 in the direction of arrow A, as shown in FIG. 1.

The user will typically have substantially aligned outwardly extending flanges 33, 34 with the lower free edges of support S, as viewed in FIG. 4.

In that manner, outwardly extending flanges 33, 34 will assist the user in guiding electrical fixture mounting assembly 10 into engagement with support S. In the case where support S has a width less than offset 52, as shown in FIG. 3, additional force may have to be exerted by the user in order to spread first and second mounting brackets 21, 22 away from each other. The force exerted by first and second mounting brackets 21, 22 on a support S (owing to first and second mounting brackets 21, 22 exerting a force to return to the initial, unspread apart distance 52) will be selected sufficiently strong so as to retain mounting assembly 10 temporarily in place on support S. The temporary engagement on support S should be sufficiently strong so the user can permanently secure first and second mounting brackets 21, 22 to support S by use of fasteners F (as shown in FIG. 4).

The operation of the embodiment of the electrical fixture mounting assembly 110 of FIGS. 5–7 will be readily apparent from the above description, and from recognizing that the spacing between first mounting bracket 121 and second mounting bracket 122 allows for electrical fixture mounting assembly 110 to be attached to a wide variety of support widths. In addition, the user can fine tune the orientation of first and second mounting brackets 121, 122 by loosening and retightening fasteners 126. Blowouts 132 assist in holding electrical fixture mounting assembly 110 temporarily in position on support S while the user is permanently fastening first and second mounting brackets 121, 122 by use of fasteners inserted through holes 130.

The electrical fixture mounting assembly 210 according to the embodiment of FIG. 8, is used in a manner similar to the preferred embodiment of FIGS. 5–7. It will be appreciated that means for securing or adhering electrical fixture mounting assembly 10 to a support includes one or more pieces of tape 251, 252. The user simply provides the adhesive, or exposes the adhesive surface of pieces of tape 251, 252, presses first and second mounting brackets 221, 222 and, hence, respective pieces of tape 251, 252 adhered thereto, against the support at the desired location. Fasteners F, one of which is shown in FIG. 8, can then be used to permanently secure electrical fixture mounting assembly 210 to support S by use of holes 230.

The still further embodiment of electrical fixture mounting assembly 310 according to my invention shown in FIG. 9, is used as follows. The user removes optional release paper 362, exposes adhesive on the face of tape 360, and presses tape 360 at the desired location onto support S. Fasteners can be inserted through mounting holes 365 into support S, as required. As in the other preferred embodiments, such fasteners will carry the weight of supported fixtures, so that junction box 312 remains unloaded.

The embodiment of fixture mounting assembly 410 of FIG. 9 is mounted when the user removes optional release paper 462, as in the embodiment of FIG. 9. Then, a fastener is inserted through mounting hole 365 and/or mounting holes provided in first and second mounting brackets 421, 422, such as in the embodiment of FIG. 5.

It is expected that the electrical fixture mounting assembly according to my invention will be made of various plastics, composite materials, stamped sheet metal, and the like, depending on the intended use. My invention has been successfully used on wooden studs, sheet metal studs, and other supports and mounting surfaces.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. An electrical fixture mounting assembly, comprising:
   a) a junction box;
   b) said junction box including a wall assembly defining a junction box cavity therein, said wall assembly including a top wall and a downwardly extending side wall;
   c) a first mounting bracket disposed on said wall, and said first mounting bracket being configured for attaching to a joist;
   d) a second mounting bracket disposed on said wall assembly, and said second mounting bracket being configured for attaching to a joist;
   e) said second mounting bracket is spaced apart from said first mounting bracket;
   f) said first and second mounting brackets being configured and positioned relative to each other for engaging opposite sides of a joist, said second mounting bracket being spaced apart from said first mounting bracket in a direction of elongation of a joist disposable between said first and second mounting brackets; and
   g) at least one of said first and second mounting, brackets being disposed on said top wall and extending upwardly away therefrom.

2. An electrical fixture mounting assembly as defined in claim 1, wherein:
   a) said second mounting bracket is variably fixedly attached to said wall of said junction box.

3. An electrical fixture mounting assembly as defined in claim 1, wherein:
   a) a piece of double-sided tape is disposed on said wall assembly, and said piece of double-sided tape is sufficiently strong for temporarily adhering said junction box to a joist.

4. An electrical fixture mounting assembly as defined in claim 1, wherein:
   a) A fixture supporting screw is provided on said first mounting bracket.

5. An electrical fixture mounting assembly as defined in claim 4, wherein:
   a) said fixture supporting screw is configured for transferring forces exerted by a fixture to said first mounting bracket substantially without exerting such forces on said junction box.

6. An electrical fixture mounting assembly, comprising:
   a) a junction box;
   b) said junction box including a wall assembly defining a junction box cavity therein, said wall assembly including a top wall and a downwardly extending side wall;
   c) means disposed on said wall assembly for engaging said junction box with opposite sides of a joist;
   d) said engaging means including a first mounting bracket;
   e) said engaging means including a second mounting bracket spaced apart from said first mounting bracket;
   f) said second mounting bracket being spaced apart from said first mounting bracket in a first direction, and said second mounting bracket being spaced apart from said first mounting bracket in a second direction extending transverse to the first direction; and
   g) at least one of said first and second mounting brackets being disposed substantially above said top wall.

7. An electrical fixture mounting assembly as defined in claim 6, wherein:
   a) means is disposed on said engaging means for fixedly securing said engaging means to a joist.

8. An electrical fixture mounting assembly as defined in claim 6, wherein:
   a) a piece of double-sided tape is disposed on said wall assembly, and said piece of double-sided tape is sufficiently strong for temporarily adhering said junction box to a joist.

9. An electrical fixture mounting assembly, comprising:
   a) a junction box;
   b) said junction box including a wall defining a junction box cavity therein;
   c) means disposed on said wall for engaging said junction box with opposite sides of an irregularly shaped joist;
   d) means disposed on said engaging means for fixedly securing said engaging means to a joist; and e) said securing means including double-sided tape.

10. An electrical fixture mounting assembly as defined in claim 9, wherein:
   a) said engaging means includes a first mounting bracket.

11. An electrical fixture mounting assembly, comprising:
   a) a junction box;
   b) said junction box including a wall defining a junction box cavity therein;
   c) means disposed on said wall for engaging said junction box with opposite sides of an irregularly shaped joist;
   d) means disposed on said wall for fixedly securing said wall to the bottom of a joist; and
   e) said securing means including double-sided tape.

12. An electrical fixture mounting assembly as defined in claim 11, wherein:
   a) said engaging means includes a first mounting bracket.

13. An electrical fixture mounting assembly, comprising:
   a) a junction box;
   b) said junction box including a wall assembly defining a junction box cavity therein, said wall assembly including a top wall and a side wall extending downwardly away therefrom;
   c) means disposed on said wall assembly for engaging said junction box with opposite sides of an irregularly shaped joist;
   d) said engaging means being disposed substantially above said cavity; and
   e) means provided on said engaging means for supporting a fixture, said fixture supporting means transferring forces exerted on said fixture supporting means substantially to said engaging means substantially without exerting such forces on said junction box.

14. An electrical fixture mounting assembly as defined in claim 13, wherein:
   a) said engaging means includes a first mounting bracket.

15. An electrical fixture mounting assembly as defined in claim 13, wherein:
   a) a piece of double-sided tape is disposed on said wall assembly, and said piece of double-sided tape is sufficiently strong for temporarily adhering said junction box to a joist.

16. An electrical fixture mounting assembly, comprising:
   a) a junction box;
   b) said junction box including a wall defining a junction box cavity therein;
   c) a first mounting bracket is disposed on said wall, and said first mounting bracket is configured for attaching to a joist;
   d) a second mounting bracket is disposed on said wall, and said second mounting bracket is configured for attaching to a joist;
   e) said second mounting bracket is spaced apart from said first mounting bracket;
   f) said first and second mounting brackets are configured and are positioned relative to each other for engaging opposite sides of an irregularly shaped joist;
   g) means disposed on said first mounting bracket for fixedly securing said mounting bracket to a joist; and
   h) said securing means including double-sided tape.

17. An electrical fixture mounting assembly as defined in claim 16, wherein:
   a) said first mounting bracket is configured for supporting a fixture and for transferring forces exerted by a fixture to said first mounting bracket substantially without transferring forces to said junction box.

18. An electrical fixture mounting assembly comprising:
   a) a junction box;
   b) said junction box including a wall assembly defining a junction box cavity therein, said wall assembly including a top wall and a downwardly extending side wall;
   c) a first mounting bracket disposed on said wall assembly, and said first mounting bracket being configured for attaching to a joist;
   d) a second mounting bracket disposed on said wall, and said second mounting bracket being configured for attaching to a joist;
   e) said second mounting bracket being spaced apart from said first mounting bracket;
   f) said first and second mounting brackets being configured and positioned relative to each other for engaging opposite sides of an irregularly shaped joist;
   g) at least one of said first and second mounting brackets being disposed substantially above said top wall; and
   h) a fixture supporting screw being provided on said first mounting bracket.

19. An electrical fixture mounting assembly as defined in claim 18, wherein:
   a) said fixture supporting screw is configured for transferring forces exerted by a fixture to said first mounting bracket substantially without exerting such forces on said junction box.

20. An electrical fixture mounting assembly as defined in claim 18, wherein:
   a) a piece of double-sided tape is disposed on said wall assembly, and said piece of double-sided tape is sufficiently strong for temporarily adhering said junction box to a joist.

21. An electrical fixture mounting assembly, comprising:
   a) a junction box;
   b) said junction box including a wall defining a junction box cavity therein;
   c) a first permanent mounting bracket disposed on said wall; and
   d) an adhesive disposed on said wall, said adhesive being sufficiently strong for temporarily adhering said junction box to a joist.

22. An electrical fixture mounting assembly as defined in claim 21, wherein:
   a) said adhesive includes a piece of tape.

23. An electrical fixture mounting assembly as defined in claim 21, wherein:
   a) said adhesive includes a patch of spray-on adhesive.

24. An electrical fixture mounting assembly as defined in claim 21, wherein:
   a) said adhesive includes a patch of glue.

25. An electrical fixture mounting assembly as defined in claim 21, wherein:
   a) a second permanent mounting bracket is disposed on said wall; and,
   b) said second permanent mounting bracket is spaced apart from said first permanent mounting bracket.

26. An electrical fixture mounting assembly as defined in claim 25, wherein:
   a) said second permanent mounting bracket is spaced apart from said first permanent mounting bracket in a direction of elongation of a joist disposable between said first and second mounting brackets.

27. An electrical fixture mounting assembly, comprising:
a) a junction box;
b) said junction box including a wall defining a junction box cavity therein;
c) means disposed on said wall for engaging said junction box with opposite sides of a joist;
d) said engaging means including a first mounting bracket;
e) said engaging means including a second mounting bracket spaced apart from said first mounting bracket;
f) said second mounting bracket being spaced apart from said first mounting bracket in a direction of elongation of a joist disposable between said first and second mounting brackets;
g) means disposed on said engaging means for fixedly securing said engaging means to a joist; and
h) said securing means including double-sided tape.

28. An electrical fixture mounting assembly, comprising:
a) a junction box;
b) said junction box including a wall defining a junction box cavity therein;
c) means disposed on said wall for engaging said junction box with opposite sides of a joist;
d) said engaging means including a first mounting bracket;
e) said engaging means including a second mounting bracket spaced apart from said first mounting bracket;
f) said second mounting bracket being spaced apart from said first mounting bracket in a direction of elongation of a joist disposable between said first and second mounting brackets;
g) means disposed on said wall for fixedly securing said wall to a bottom portion of a joist; and
h) said securing means including double-sided tape.

29. An electrical fixture mounting assembly, comprising:
a) a junction box;
b) said junction box including a wall defining a junction box cavity therein;
c) means disposed on said wall for engaging said junction box with opposite sides of a joist;
d) said engaging means including a first mounting bracket;
e) said first mounting bracket being variably fixedly attached to said wall of said junction box; and
f) a piece of double-sided tape disposed on said wall, and said piece of double-sided tape is sufficiently strong for temporarily adhering said junction box to a joist.

30. An electrical fixture mounting assembly, comprising:
a) a junction box;
b) said junction box including a wall defining a junction box cavity therein;
c) means disposed on said wall for engaging said junction box with opposite sides of a joist;
d) said engaging means including a first mounting bracket;
e) said engaging means including a second mounting bracket;
f) said second mounting bracket being spaced apart from said first mounting bracket in a direction of elongation of a joist disposable between said first and second mounting brackets, and said second mounting bracket being substantially free of a direct connection with said first mounting bracket;
g) means disposed on said engaging means for fixedly securing said engaging means to a joist; and
h) said securing means including double-sided tape.

31. An electrical fixture mounting assembly, comprising:
a) a junction box;
b) said junction box including a wall defining a junction box cavity therein;
c) means disposed on said wall for engaging said junction box with opposite sides of a joist;
d) said engaging means including a first mounting bracket;
e) said engaging means including a second mounting bracket;
f) said second mounting bracket being spaced apart from said first mounting bracket in a direction of elongation of a joist disposable between said first and second mounting brackets, and said second mounting bracket being substantially free of a direct connection with said first mounting bracket;
g) means disposed on said wall for fixedly securing said wall to a bottom of a joist; and
h) said securing means including double-sided tape.

32. An electrical fixture mounting assembly, comprising:
a) a junction box;
b) said junction box including a wall defining a junction box cavity therein;
c) means disposed on said wall for engaging said junction box with opposite sides of a joist;
d) said engaging means including a first mounting bracket;
e) said engaging means including a second mounting bracket;
f) said second mounting bracket being spaced apart from said first mounting bracket in a direction of elongation of a joist disposable between said first and second mounting brackets, and said second mounting bracket being substantially free of a direct connection with said first mounting bracket; and
g) means is provided on said engaging means for supporting a fixture, said fixture supporting means transferring forces exerted on said fixture supporting means substantially to said engaging means substantially without exerting such forces on said junction box.

33. An electrical fixture mounting assembly as defined in claim 32, wherein:
a) said fixture supporting means includes a screw.

* * * * *